United States Patent
Galbo et al.

(10) Patent No.: US 7,231,643 B1
(45) Date of Patent: Jun. 12, 2007

(54) IMAGE RESCUE SYSTEM INCLUDING DIRECT COMMUNICATION BETWEEN AN APPLICATION PROGRAM AND A DEVICE DRIVER

(75) Inventors: Neal Anthony Galbo, Boca Raton, FL (US); Berhanu Iman, Sunyvale, CA (US); Ngon Le, Santa Clara, CA (US)

(73) Assignee: Lexar Media, Inc., Fremont, CA (US)

( * ) Notice: Subject to any disclaimer, the term of this patent is extended or adjusted under 35 U.S.C. 154(b) by 656 days.

(21) Appl. No.: 10/371,930

(22) Filed: Feb. 21, 2003

Related U.S. Application Data

(60) Provisional application No. 60/359,510, filed on Feb. 22, 2002.

(51) Int. Cl.
*G06F 9/44* (2006.01)
(52) U.S. Cl. .......................................... 719/321; 714/2
(58) Field of Classification Search ................ 719/310, 719/320–329; 714/2, 5, 15, 20; 711/100
See application file for complete search history.

(56) References Cited

U.S. PATENT DOCUMENTS

| | | |
|---|---|---|
| 4,099,069 A | 7/1978 | Cricchi |
| 4,130,900 A | 12/1978 | Watanabe |
| 4,210,959 A | 7/1980 | Wozniak |
| 4,309,627 A | 1/1982 | Tabata |
| 4,355,376 A | 10/1982 | Gould |
| 4,398,248 A | 8/1983 | Hsia |
| 4,405,952 A | 9/1983 | Slakmon |
| 4,414,627 A | 11/1983 | Nakamura |
| 4,450,559 A | 5/1984 | Bond et al. |
| 4,456,971 A | 6/1984 | Fukuda et al. |
| 4,468,730 A | 8/1984 | Dodd |
| 4,473,878 A | 9/1984 | Zolnovsky |
| 4,476,526 A | 10/1984 | Dodd |
| 4,498,146 A | 2/1985 | Martinez |
| 4,525,839 A | 6/1985 | Nozawa et al. |

(Continued)

FOREIGN PATENT DOCUMENTS

AU 0 557 723 1/1987

(Continued)

OTHER PUBLICATIONS

Mendel Rosenblum and John K. Ousterhout, The Design and Implementation of a Log-Structured File System, article, 1991, 15 pgs., Berkeley, USA.

(Continued)

*Primary Examiner*—William Thomson
*Assistant Examiner*—George Opie
(74) *Attorney, Agent, or Firm*—Maryam Ima

(57) ABSTRACT

An image rescue system includes an application program for communication with a mass storage device, the application program being in communication with an operating system layer for accessing the mass storage device to read and write information, in accordance with an embodiment of the present invention. The image rescue system further includes a device driver in direct communication with the application program, and in communication with the operating system layer and the mass storage device, the mass storage device allowing the application program to search information in the mass storage device considered damaged by the operating system layer, the damaged information being inaccessible to the operating system layer.

13 Claims, 2 Drawing Sheets

U.S. PATENT DOCUMENTS

| | | |
|---|---|---|
| 4,532,590 A | 7/1985 | Wallach |
| 4,609,833 A | 9/1986 | Gutterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |
| 4,748,320 A | 5/1988 | Yorimoto et al. |
| 4,757,474 A | 7/1988 | Fukushi et al. |
| 4,774,700 A | 9/1988 | Satoh et al. |
| 4,780,855 A | 10/1988 | Iida |
| 4,788,665 A | 11/1988 | Fukuda |
| 4,797,543 A | 1/1989 | Watanabe |
| 4,800,520 A | 1/1989 | Iijima |
| 4,829,169 A | 5/1989 | Watanabe |
| 4,843,224 A | 6/1989 | Ohta |
| 4,896,262 A | 1/1990 | Wayama et al. |
| 4,914,529 A | 4/1990 | Bonke |
| 4,920,518 A | 4/1990 | Nakamura et al. |
| 4,924,331 A | 5/1990 | Robinson et al. |
| 4,943,745 A | 7/1990 | Watanabe |
| 4,953,122 A | 8/1990 | Williams |
| 4,970,642 A | 11/1990 | Yamamura |
| 4,970,727 A | 11/1990 | Miyawaki |
| 5,070,474 A | 12/1991 | Tuma et al. |
| 5,093,785 A | 3/1992 | Ijima |
| 5,168,465 A | 12/1992 | Harari |
| 5,198,380 A | 3/1993 | Harari |
| 5,200,959 A | 4/1993 | Gross et al. |
| 5,218,695 A | 6/1993 | Novert |
| 5,220,518 A | 6/1993 | Haq |
| 5,226,168 A | 7/1993 | Kobayashi et al. |
| 5,227,714 A | 7/1993 | Lou |
| 5,253,351 A | 10/1993 | Yamamoto |
| 5,267,218 A | 11/1993 | Elbert |
| 5,268,318 A | 12/1993 | Harari |
| 5,268,870 A | 12/1993 | Harari |
| 5,270,979 A | 12/1993 | Harari et al. |
| 5,293,560 A | 3/1994 | Harari |
| 5,303,198 A | 4/1994 | Adachi |
| 5,305,276 A | 4/1994 | Uenoyama |
| 5,305,278 A | 4/1994 | Inoue |
| 5,315,541 A | 5/1994 | Harari et al. |
| 5,315,558 A | 5/1994 | Hag |
| 5,329,491 A | 7/1994 | Brown |
| 5,337,275 A | 8/1994 | Garner |
| 5,341,330 A | 8/1994 | Wells |
| 5,341,339 A | 8/1994 | Wells |
| 5,341,341 A | 8/1994 | Fukuzo |
| 5,353,256 A | 10/1994 | Fandrich et al. |
| 5,357,475 A | 10/1994 | Hasbun et al. |
| 5,359,569 A | 10/1994 | Fujita |
| 5,365,127 A | 11/1994 | Manley |
| 5,369,615 A | 11/1994 | Harari et al. |
| 5,371,702 A | 12/1994 | Nakai |
| 5,381,539 A | 1/1995 | Yanai |
| 5,382,839 A | 1/1995 | Shinohara |
| 5,384,743 A | 1/1995 | Rouy |
| 5,388,083 A | 2/1995 | Assar |
| 5,396,468 A | 3/1995 | Harari et al. |
| 5,404,485 A | 4/1995 | Ban |
| 5,406,527 A | 4/1995 | Honma |
| 5,418,752 A | 5/1995 | Harari |
| 5,422,842 A | 6/1995 | Cernea et al. |
| 5,422,856 A | 6/1995 | Sasaki |
| 5,428,621 A | 6/1995 | Mehrotha et al. |
| 5,430,682 A | 7/1995 | Ishikawa |
| 5,430,859 A | 7/1995 | Norman et al. |
| 5,431,330 A | 7/1995 | Wieres |
| 5,434,825 A | 7/1995 | Harari |
| 5,438,573 A | 8/1995 | Mangan et al. |
| 5,465,235 A | 11/1995 | Miyamoto |
| 5,465,338 A | 11/1995 | Olay |
| 5,471,478 A | 11/1995 | Mangan et al. |
| 5,473,765 A | 12/1995 | Gibbons |
| 5,479,638 A | 12/1995 | Assar |
| 5,485,595 A | 1/1996 | Assar et al. |
| 5,490,117 A | 2/1996 | Oda |
| 5,495,442 A | 2/1996 | Cernea et al. |
| 5,504,760 A | 4/1996 | Harari et al. |
| 5,508,971 A | 4/1996 | Cernea et al. |
| 5,513,138 A | 4/1996 | Manabe |
| 5,515,333 A | 5/1996 | Fujita |
| 5,519,847 A | 5/1996 | Fandrich |
| 5,523,980 A | 6/1996 | Sakui |
| 5,524,230 A | 6/1996 | Sakaue |
| 5,530,673 A | 6/1996 | Tobita |
| 5,530,828 A | 6/1996 | Kaki |
| 5,530,938 A | 6/1996 | Akasaka |
| 5,532,962 A | 7/1996 | Auclair et al. |
| 5,532,964 A | 7/1996 | Cernea et al. |
| 5,534,456 A | 7/1996 | Yuan et al. |
| 5,535,328 A | 7/1996 | Harari et al. |
| 5,541,551 A | 7/1996 | Brehner |
| 5,544,118 A | 8/1996 | Harari |
| 5,544,356 A | 8/1996 | Robinson |
| 5,552,698 A | 9/1996 | Tai |
| 5,554,553 A | 9/1996 | Harari |
| 5,563,825 A | 10/1996 | Cernea et al. |
| 5,566,314 A | 10/1996 | DeMarco et al. |
| 5,568,439 A | 10/1996 | Harari |
| 5,572,466 A | 11/1996 | Sukegawa |
| 5,579,502 A | 11/1996 | Konishi |
| 5,581,723 A | 12/1996 | Hasbun |
| 5,583,812 A | 12/1996 | Harari |
| 5,592,415 A | 1/1997 | Kato |
| 5,592,420 A | 1/1997 | Cernea et al. |
| 5,596,526 A | 1/1997 | Assar et al. |
| 5,598,370 A | 1/1997 | Nijima |
| 5,602,987 A | 2/1997 | Harari |
| 5,603,001 A | 2/1997 | Sukegawa |
| 5,606,660 A | 2/1997 | Estakhri et al. |
| 5,611,067 A | 3/1997 | Okamoto |
| 5,640,528 A | 6/1997 | Harney et al. |
| 5,642,312 A | 6/1997 | Harari |
| 5,648,929 A | 7/1997 | Miyamoto |
| 5,663,901 A | 9/1997 | Wallace et al. |
| 5,693,570 A | 12/1997 | Cernea et al. |
| 5,712,819 A | 1/1998 | Harari |
| 5,719,808 A | 2/1998 | Harari et al. |
| 5,723,990 A | 3/1998 | Roohparvar |
| 5,734,567 A | 3/1998 | Griffiths |
| 5,745,418 A | 4/1998 | Kabayashi |
| 5,754,567 A | 5/1998 | Norman |
| 5,757,712 A | 5/1998 | Nagel |
| 5,758,100 A | 5/1998 | Odisho |
| 5,761,117 A | 6/1998 | Uchino |
| 5,768,190 A | 6/1998 | Tanaka |
| 5,768,195 A | 6/1998 | Nakamuri |
| 5,773,901 A | 6/1998 | Kantner |
| 5,778,418 A | 7/1998 | Auclair et al. |
| 5,781,478 A | 7/1998 | Takeuchi |
| 5,787,445 A | 7/1998 | Daberko |
| 5,787,484 A | 7/1998 | Norman |
| RE35,881 E | 8/1998 | Barrett |
| 5,799,168 A | 8/1998 | Ban |
| 5,802,551 A | 9/1998 | Komatsu |
| 5,809,515 A | 9/1998 | Kaki |
| 5,809,558 A | 9/1998 | Matthews |
| 5,809,560 A | 9/1998 | Scheider |
| 5,818,350 A | 10/1998 | Estakhri et al. |
| 5,818,781 A | 10/1998 | Estakhri |
| 5,822,245 A | 10/1998 | Gupta |
| 5,822,252 A | 10/1998 | Lee |
| 5,822,781 A | 10/1998 | Wells |

| | | |
|---|---|---|
| 5,831,929 A | 11/1998 | Manning |
| 5,835,935 A | 11/1998 | Estakhri |
| 5,838,614 A | 11/1998 | Estakhri et al. |
| 5,845,313 A | 12/1998 | Estakhri |
| 5,847,552 A | 12/1998 | Brown |
| 5,860,083 A | 1/1999 | Sukegawa |
| 5,860,124 A | 1/1999 | Matthews |
| 5,862,099 A | 1/1999 | Gannage |
| 5,890,192 A | 3/1999 | Lee |
| 5,901,086 A | 5/1999 | Wang |
| 5,901,312 A | 5/1999 | Radko |
| 5,907,856 A | 5/1999 | Estakhri |
| 5,909,586 A | 6/1999 | Anderson |
| 5,920,884 A | 7/1999 | Jennings |
| 5,924,113 A | 7/1999 | Estakhri et al. |
| 5,928,370 A | 7/1999 | Asnaashari |
| 5,930,815 A | 7/1999 | Estakhri |
| 5,933,368 A | 8/1999 | Ma |
| 5,933,846 A | 8/1999 | Endo |
| 5,936,971 A | 8/1999 | Harari |
| 5,937,425 A | 8/1999 | Ban |
| 5,953,737 A | 9/1999 | Estakhri |
| 5,956,473 A | 9/1999 | Ma |
| 5,959,926 A | 9/1999 | Jones |
| 5,966,727 A | 10/1999 | Nishino |
| 5,974,439 A | 10/1999 | Bollella |
| 5,987,563 A | 11/1999 | Itoh |
| 5,987,573 A | 11/1999 | Hiraka |
| 5,988,933 A | 11/1999 | Wilhelmstatter |
| 5,991,849 A | 11/1999 | Yamada |
| 6,011,322 A | 1/2000 | Stunfall |
| 6,011,323 A | 1/2000 | Camp |
| 6,018,265 A | 1/2000 | Keshtbod |
| 6,021,408 A | 2/2000 | Ledain |
| 6,026,020 A | 2/2000 | Matsubara |
| 6,026,027 A | 2/2000 | Terrell |
| 6,034,897 A | 3/2000 | Estakhri |
| 6,035,357 A | 3/2000 | Sakaki |
| 6,040,997 A | 3/2000 | Estakhri |
| 6,047,307 A | 4/2000 | Radko |
| 6,047,352 A | 4/2000 | Lakhani |
| 6,055,184 A | 4/2000 | Acharya |
| 6,055,188 A | 4/2000 | Takeuchi |
| 6,069,827 A | 5/2000 | Sinclair |
| 6,072,796 A | 6/2000 | Christensen |
| 6,076,137 A | 6/2000 | Asnaashari |
| 6,081,447 A | 6/2000 | Lofgren |
| 6,081,878 A | 6/2000 | Estakhri |
| 6,084,483 A | 7/2000 | Keshtbod |
| 6,097,666 A | 8/2000 | Sakui |
| 6,115,785 A | 9/2000 | Estakhri |
| 6,122,195 A | 9/2000 | Estakhri |
| 6,125,424 A | 9/2000 | Komatsu |
| 6,125,435 A | 9/2000 | Estakhri |
| 6,128,695 A | 10/2000 | Estakhri |
| 6,134,145 A | 10/2000 | Wong |
| 6,134,151 A | 10/2000 | Estakhri |
| 6,141,249 A | 10/2000 | Estakhri |
| 6,145,051 A | 11/2000 | Estakhri |
| 6,151,247 A | 11/2000 | Estakhri |
| 6,172,906 B1 | 1/2001 | Estakhri et al. |
| 6,173,362 B1 | 1/2001 | Yoda |
| 6,181,118 B1 | 1/2001 | Meehan |
| 6,182,162 B1 | 1/2001 | Estakhri |
| 6,202,138 B1 | 3/2001 | Estakhri |
| 6,223,308 B1 | 4/2001 | Estakhri |
| 6,226,708 B1 | 5/2001 | McGoldrick |
| 6,230,234 B1 | 5/2001 | Estakhri |
| 6,262,918 B1 | 7/2001 | Estakhri |
| 6,272,610 B1 | 8/2001 | Katayama |
| 6,275,436 B1 | 8/2001 | Tobita et al. |
| 6,279,069 B1 | 8/2001 | Robinson |
| 6,279,114 B1 | 8/2001 | Toombs |
| 6,285,607 B1 | 9/2001 | Sinclair |
| 6,327,639 B1 | 12/2001 | Asnaashari |
| 6,345,367 B1 | 2/2002 | Sinclair |
| 6,374,337 B1 | 4/2002 | Estakhri |
| 6,393,513 B2 | 5/2002 | Estakhri |
| 6,397,314 B1 | 5/2002 | Estakhri |
| 6,411,546 B1 | 6/2002 | Estakhri |
| 6,467,021 B1 | 10/2002 | Sinclair |
| 6,490,649 B2 | 12/2002 | Sinclair |
| 6,567,307 B1 | 5/2003 | Estakhri |
| 6,578,127 B1 | 6/2003 | Sinclair |
| 6,587,382 B1 | 7/2003 | Estakhri et al. |
| 6,711,059 B2 | 3/2004 | Sinclair et al. |
| 6,725,321 B1 | 4/2004 | Sinclair et al. |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,813,678 B1 | 11/2004 | Sinclair et al. |
| 6,898,662 B2 | 5/2005 | Gorobets |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |
| 2003/0033471 A1 | 2/2003 | Lin |

FOREIGN PATENT DOCUMENTS

| | | |
|---|---|---|
| EP | 0 220 718 A2 | 5/1987 |
| EP | 0 243 503 A1 | 11/1987 |
| EP | 0 392 895 A2 | 10/1990 |
| EP | 0 424 191 A2 | 4/1991 |
| EP | 0 489 204 A1 | 6/1992 |
| EP | 0 522 780 A2 | 1/1993 |
| EP | 0 522 780 B1 | 1/1993 |
| EP | 0 544 252 A2 | 6/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| EP | 0 686 976 A2 | 12/1995 |
| EP | 2 304 428 | 3/1997 |
| EP | 0 897 579 B1 | 7/2000 |
| EP | 0 891 580 B1 | 11/2000 |
| EP | 0 896 669 B1 | 11/2000 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| FR | 93 01908 | 8/1993 |
| GB | 2 251 323 | 7/1992 |
| GB | 2 291 990 | 2/1996 |
| GB | 2 291 991 A | 7/1996 |
| GB | 2 297 637 A | 7/1996 |
| GB | 2 348 991 B | 12/2002 |
| GB | 2 351 822 B | 1/2003 |
| GB | 2 384 337 A | 7/2003 |
| GB | 2 384 883 A | 10/2005 |
| GB | 2 384 338 B | 11/2005 |
| GB | 2 384 072 B | 12/2005 |
| GB | 2 411 499 B | 2/2006 |
| IS | 117881 | 5/2003 |
| JP | 3-228377 | 10/1981 |
| JP | 59-45695 A | 9/1982 |
| JP | 58-215794 A | 12/1983 |
| JP | 58-215795 A | 12/1983 |
| JP | 59-92483 | 5/1984 |
| JP | 59-162695 A | 9/1984 |

| | | |
|---|---|---|
| JP | 60-212900 | 10/1985 |
| JP | 61-96598 A | 5/1986 |
| JP | 62-283496 A | 12/1987 |
| JP | 62-283497 A | 12/1987 |
| JP | 63-183700 A | 7/1988 |
| JP | 1-138694 | 5/1989 |
| JP | 4-57295 | 2/1992 |
| JP | 4-254994 | 9/1992 |
| JP | 4-268284 | 9/1992 |
| JP | 4-278297 | 10/1992 |
| JP | 4-332999 A | 11/1992 |
| JP | 5-128877 | 5/1993 |
| JP | 5-282883 | 10/1993 |
| JP | 6-4399 | 1/1994 |
| JP | 6-36578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-84871 | 3/1995 |
| JP | 7-93499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-18018 | 1/1996 |
| JP | 37697 | 2/1996 |
| JP | 8-69696 | 3/1996 |
| JP | 9-147581 | 6/1997 |
| SU | 1388877 A1 | 4/1988 |
| SU | 1408439 A1 | 7/1988 |
| SU | 1515164 A1 | 10/1989 |
| SU | 1541619 A1 | 2/1990 |
| SU | 1573458 A2 | 6/1990 |
| SU | 1686449 A2 | 10/1991 |
| WO | WO 84/00628 | 2/1984 |
| WO | WO 94/20906 | 9/1994 |

OTHER PUBLICATIONS

Brian Dipert and Markus Levy, Designing with Flash Memory, book, Apr. 1994, 445 pgs., Annabooks, San Diego, USA.
Science Forum, Inc., Flash Memory Symposium '95,symposium, 1995, 13 pgs.; Hongo,Bunkyo-ku, Tokyo.
Ross S. Finlayson and David R. Cheriton, An Extended File Service Exploiting Write-Once Storage, article, 1987, 10 pgs. ACM.
Jason Gait, The Optical File Cabinet: A Random-Access File System for Write-Once Optical Disks, article, Jun. 1988, 12 pgs., Beaverton, Oregon.
Henry G. Baker, Memory Management, book, 1995, 19 pgs., Springer-Verlag Berlin Heidelberg, Germany.
Sape J. Mullender and Andrew S. Tanenbaum, A Distributed File Service Based on Optimistic Concurrency Control, article, 1985, 12 pgs., ACM.
Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers,, 2 pgs.
Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs.., vol. E79-C, No. 6.
Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid-State Circuits, vol. 26, No. 4.
Kai Hwang and Faye A. Briggs, Computer Architecture and Parallel Processing, book, 1984, McGraw-Hill, Inc., 2 pgs., US.

Walter Lahti and Dean McCarron, State of the Art: Magnetic VS. Optical Store Data in a Flash, article, 1990, 7 pgs., vol. 15, No. 12, McGraw-Hill, Inc., US.
Ron Wilson, Integrated Circuits; 1-Mbit flash memories seek their role in system design, article, Mar. 1, 1989, 2 pgs., No. 6, Tulsa, OK.
S. Mehroura, J.H. Yuan, R.A. Cemea, W.Y. Chien, D.C. Guteman, G. Samachisa, R.D. Noman, M. Mofidi, W.Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium, 1992, 2 pgs., Mountain View, CA.
Steven H. Leibson, Nonvolatile, in-circuit-reprogrammable memories, article, Jan. 3, 1991, 12 pgs., EDN, Circle No. 12.
Ramon Caceres, Fred Douglis, Kai Li and Brian Marsh, Operationg System Implications of Solid-State Mobile Computers, article, 7 pgs., Oct. 1993, Workshop on Workstation Operting Systems.
Michael Wu and Wily Zwaenepoel, A Non-Volatile, Main Memory Storage System, 12 pgs., 1994, ACM, San Jose, CA USA.
Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v.42,n. 10, The Gale Group.
Anthony Cataldo, New flash enhancements are up ante. (Intel's 28F400BV-120 and 28F004BV-120, Atmel's AT29BV010 and AT29BV020, and Samsung Semiconductor's KM29V32000 *flash* memory* devices)(Product Announcement), article, Mar. 13, 1995, 4 pgs., Electronic News, v.41, n.2056, The Gale Group.
Sam Weber, *Flash* modules' portability, reusability, small size valued for a host of APPs-Consumer formats flocking to *flash*, article, Jul. 22, 1996, 9 pgs., Electronic Engineering Times, n.911, CMP Media.
Toshiba, MOS Memory (Non-Volatile), 1995, Data Book.
Stan Baker, but Integration Calls for Hardware, Software Changes: Flash: designers face the dawn of a new memory age, article, Sep. 12, 2003, 5 pgs., Electronic Engineering Times, 1990, N.619, 41, CMP Media.
Toshiba, Toshiba MOS Digital Integrated Circuit Silicon Gate CMOS, (TC58NS512DC) Mar. 21, 2001, 43 pgs., Data Book.
Toshiba Corporation, SMIL (Smartmedia Interface Library) Hardware Edition Version 1.00, Jul. 1, 2000, 36 pgs., Data Book.
Toshiba, Toshiba MOS Digital Integrated Circuit Silicon Gate, (TC58512FT), Mar. 5, 2001, 43 pgs., Data Book.
Toshiba, Toshiba MOS Digital Integrated Circuit Silicon Gate, (TC58DVM92A1FT00), Jan. 10, 2003, 44 pgs., Data Book.
Toshiba, Toshiba MOS Digital Integrated Circuit Silicon Gate, (TC58DVG02A1FT00), Jan. 10, 2003, 44 pgs., Data Book.
Toshiba, Toshiba MOS Digital Integrated Circuit Silicon Gate, (TH58100FT), Mar. 5, 2001, 43 pgs., Data Book.
35Nonvolatile Memory Technology Review, A Time of Change, Proceedings 1993 Conference, Jun. 22-24, 1993, Linthicum Heights, MD USA.
Toshiba Corporation, SMIL (Smartmedia Interface Library) Software Edition Version 1.00, Jul. 1, 2000, 136 pgs., Data Book.
Toshiba, MOS Memory (Non-Volatile), 1996, 279 pgs., Data Book.
Dan Auclair, Optimal Solid State Disk Architecture For Portable Computers, symposium, Jul. 9, 1991, 7 pgs., SunDisk Corporation.
Book- Computer Architecture and Parallel Processing, Kai Hwang & Faye A. Briggs, McGraw-Hill Book Co., Copyright 1984, p. 64.
Magazine-"State of the Art : Magnetic VS. Optical Store Data ina Flash", by Walter Lahti and Dean McCarron, Byte magazine dated Nov. 1, 1990.311, vol. 15, No. 12.
Magazine—Technology Updates, Integrated Cirrcuits, "1-Mbit flash memories seek their role in system design", Ron Wilson, Senior Editor, Computer Design magazine 28 (1989) Mar. 1, No. 5, Tulsa OK, US, pp. 30 and 32 . . . .
1992 Symposium of VLSI Circuits Digest of Technical Papers, "EEPROM for Solid State Disk Applications", S. Mehoura et al., SunDisk Corporation, Santa Clara, CA. R.W. Gregor et al., AT&T Bell Laboratories, Allentown, PA, pp. 24 and 25.

IMAGE RESCUE SYSTEM INCLUDING DIRECT COMMUNICATION BETWEEN AN APPLICATION PROGRAM AND A DEVICE DRIVER

REFERENCE TO PRIOR APPLICATION

This application claims the benefit of a previously filed U.S. Provisional Application No. 60/359,510 filed on Feb. 22, 2002, and entitled "IMAGE RESCUE."

BACKGROUND OF THE INVENTION

1. Field of the Invention

The present invention relates generally to the field of retrieval and recovery of information and particularly to rapid and efficient retrieval and recovery of information stored in a mass storage device, which is accessible or inaccessible to an operating system.

2. Description of the Prior Art

In modern electronic systems, storage, retrieval, and recovery of digital information plays a significant role in the operation of devices included within such systems. A common example of an electronic system is a personal computer (PC), which requires access to digital data for processing thereof to perform and execute a wide variety of tasks. Digital data may be stored in a PC either internally as in a hard disk or externally in a mass storage data device such as a digital photo reader or a compact flash reader device.

In the conventional methods of accessing digital data, as implemented in electronic systems, an application program operating under a standard commercially available operating system accesses a mass storage data device for reading and/or writing of digital data. The operating system recognizes the mass storage data device and "mounts" it as an operating system data volume, i.e. a "disk drive". The application program thereby accesses the mass storage data device at the logical level within the operating system using the operating system formatting information included within the mass storage data device.

However, the conventional methods of accessing digital data have a limitation that is encountered when the mass storage data device is for some reason corrupted. In the event of corruption of the mass storage data device, the electronic system cannot recover the digital data simply because the operating system is unable to communicate with the mass storage data device. Another limitation of the conventional methods of accessing digital data is that the application program commands the mass storage data device only with standard commands available to the operating system.

In light of the foregoing, it is desirable to develop a method and apparatus for accessing digital data even when the mass storage data device is corrupted and the operating system cannot communicate therewith. Further, the method and apparatus should not interfere with normal operations of the operating system, i.e. be transparent to the operating system. The desired method and apparatus should be able to access, retrieve, and recover information efficiently and cost-effectively.

SUMMARY OF THE INVENTION

Briefly, an embodiment of the present invention includes an image rescue system having an application program for communication with a mass storage device, said application program being in communication with an operating system layer for accessing said mass storage device to read and write information. The image rescue system further includes a device driver in communication with said application program, said operating system layer and said mass storage device, said device driver for allowing said application program to access said mass storage device to read and write information by bypassing said operating system layer, said device driver for communicating with said mass storage device to allow said application program to rapidly access information in said mass storage device considered damaged by said operating system layer, said damaged information being inaccessible to said operating system layer, wherein said image rescue system accesses said mass storage device to rapidly and efficiently retrieve and recover information accessible and inaccessible to said operating system layer.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
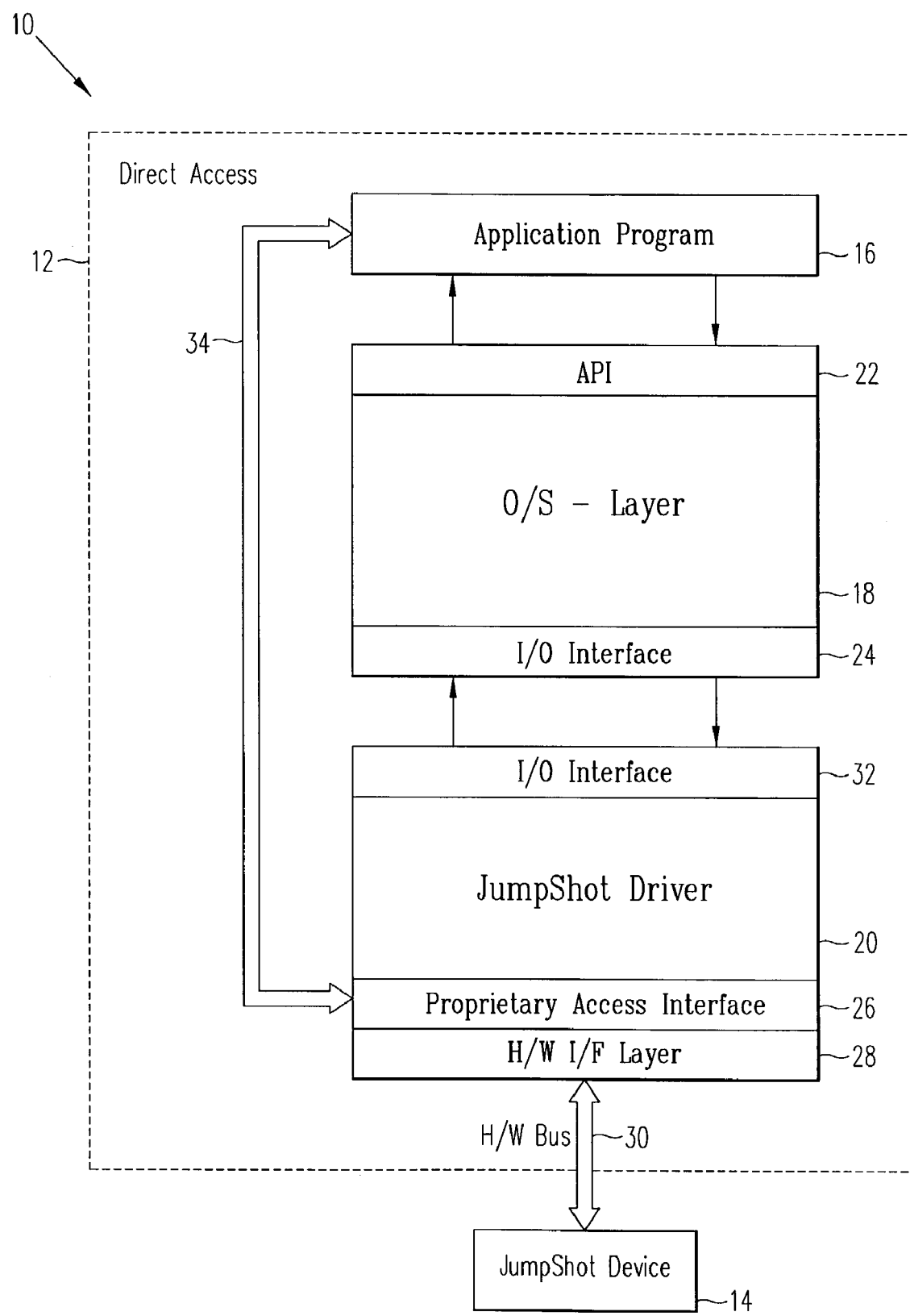
FIG. 1 shows an image rescue system 10, in accordance with an embodiment of the present invention.

The present invention employs a technique for directly accessing common mass storage data devices at the physical, rather than logical, device level; without assistance from operating system programming facilities. This allows for recovery, reconstruction and retrieval of valid user data files from a mass storage data device that the operating system would normally consider a "damaged" or corrupted mass storage data device.

The present invention allows the operating system to be extended to support the addition of an external mass storage data device to be added to the operating system as a standard system data volume or what is commonly known as a "disk drive". An application program in concert with a device driver for the mass storage data device allow for rapid retrieval of what appears to be to the operating system "lost" or corrupted data from the mass storage data device.

In one embodiment of the present invention, the "mass storage data device" for which the application and driver is designed is Lexar Media, Inc. brand compact Flash cards connected to a personal computer (PC) or a Macintosh computer (Mac) via a universal serial bus (USB) 1.x connection via a Lexar Media brand Jumpshot cable. The application is not limited to this type of mass storage data device or this type of connection to the computer. The techniques described below will work for almost any mass storage data device, any storage technology, which is connected to the host computer in almost any way.

As will be explained in further detail with respect to FIG. 1, the application program employs a novel I/O access technique to allow the application program that is operating under a standard commercially available operating system to access a mass storage data device for reading or writing, regardless of whether or not the operating system recognizes the mass storage data device as a valid operating system formatted storage device such as a disk volume. That is, communication with the mass storage data device is possible through the Lexar application program whether or not the operating system recognizes the mass storage data device and "mounts" it as an operating system data volume, i.e. "disk drive". The application can access the mass storage data device at the physical device level, as opposed to what is commonly known as the logical device level within the operating system. This is accomplished by a unique and novel method within the Lexar Media operating system extension device driver that supports the mass storage data device. The device driver is commonly supplied by the mass storage data device manufacturer or the author of the application program utility, i.e. Lexar Media. The technique employed is to include an additional proprietary layer of program interface within the standard device driver. This additional layer provides added functionality to allow an application program that is aware of this added interface to directly access the facilities provided within the device driver while circumventing the operating system. The operating system is completely unaware of this added proprietary access interface within the device driver. The device driver appears to the operating system to be a "standard" device driver in all respects; the operating system is completely unaware of the additional proprietary interface. The application program is able to locate the proprietary interface within the device driver using standard operating system functions and procedures. Once the proprietary interface is located and "attached" to the application program, the application program can call the functions and procedures located within the proprietary interface. The functions and procedures within the proprietary interface are "invisible" to the operating system and do not interfere with the operating system and its normal interaction with the Lexar device driver. The functions and procedures within the proprietary interface allow the Lexar application program to access the mass storage data device at the physical level; allowing the application program to command the mass storage data device with standard commands along with vendor unique commands; thus allowing the application program to access information and data areas that are not normally accessible to the operating system.

Referring now to FIG. 1, an image rescue system 10 is shown to include a personal computer (PC) 12 coupled to a device 14 in accordance with an embodiment of the present invention. The device 14 can be one of many types of devices, examples of which are compact flash reader devices, a digital photo reader, a Jumpshot product manufactured by Lexar Media, Inc. of Fremont, Calif., or any other type of mass storage product.

The PC 12 is shown to include an application program 16, which is in communication with the operating system layer 18 through an application program interface 22. The operating system layer 18 is shown to be in communication with a driver 20 through an operating system input/output (I/O) interface 24 and a driver I/O interface 32. The driver 20 is shown to include an access interface 26, which causes direct communication with the device 14 through a hardware interface layer 28 and the hardware bus 30. As shown in FIG. 1, the application program 16 is in direct communication with the access interface 26 through the direct access bus 34 thereby circumventing the operating system layer 18.

In various embodiments of the present invention, the hardware bus 30 conforms to different standards and is thus referred to as a different interface. Examples of the different types of hardware bus 30 are USB, PCMCIA, IDE, mass storage interface, fire wire and blue tooth.

In prior art methods, the application program must communicate through the operating system layer to the driver. The problem with such prior art methods is that in the event of some sort of corruption of the device 14, the system can not recover the device simply because the operating system is unable to communicate with the device. In the present invention however, the driver 20 identifies the device 14 and recovers the information previously stored in the device even though the device 14 includes corrupt information. It should be noted that different drivers 20 are employed for different types of devices that device 14 can be. Similarly, the access interface 26 includes different extensions based upon the kind of device employed as device 14. Bypassing the operating system layer 18 enables establishing communication with devices, as device 14, that the PC 12 is not able to communicate with if the operating system layer 18 is not bypassed.

Referring still to FIG. 1, the application program 16 rapidly searches and recovers certain types of user data files from a corrupted or non-corrupted mass storage data device, i.e. device 14. The device 14 is searched at the physical "raw" device level without the benefit of using the operating system layer 18 formatting information that may or may not be included within the device 14.

The technique employed searches for certain data file types that have distinguishable data "headers". The "header" area includes data patterns that are unique to certain file types, for example, but not limited to, joint photographic experts group (JPEG) files or tagged image file format (TIFF) files. The application program also utilizes information gathered from the mass storage data device to formulate an algorithm to allow for an intelligent search of the mass storage data device instead of a "brute force" byte-by-byte search. The application program first directly queries the mass storage data device for its device characteristics using the access technique described hereinabove. This information is used to establish the absolute size in bytes of the device 14 along with obtaining its physical block size.

The physical block size, described in units of bytes, is the smallest unit of access that can be read or written to the mass storage data device. This unit is usually described as a binary multiple of a number of bytes, usually in the range of hundreds or thousands of bytes. The application will then attempt to read the operating system formatting information on the mass storage data device. This information is operating system dependent, the application knows what operating system it is running under and interprets the data accordingly. Since the formatting data may be damaged or corrupted, the application program attempts to determine if the formatting information is valid by examining certain operating system specific parameters contained within the formatting information for reasonable values.

Figure 2:
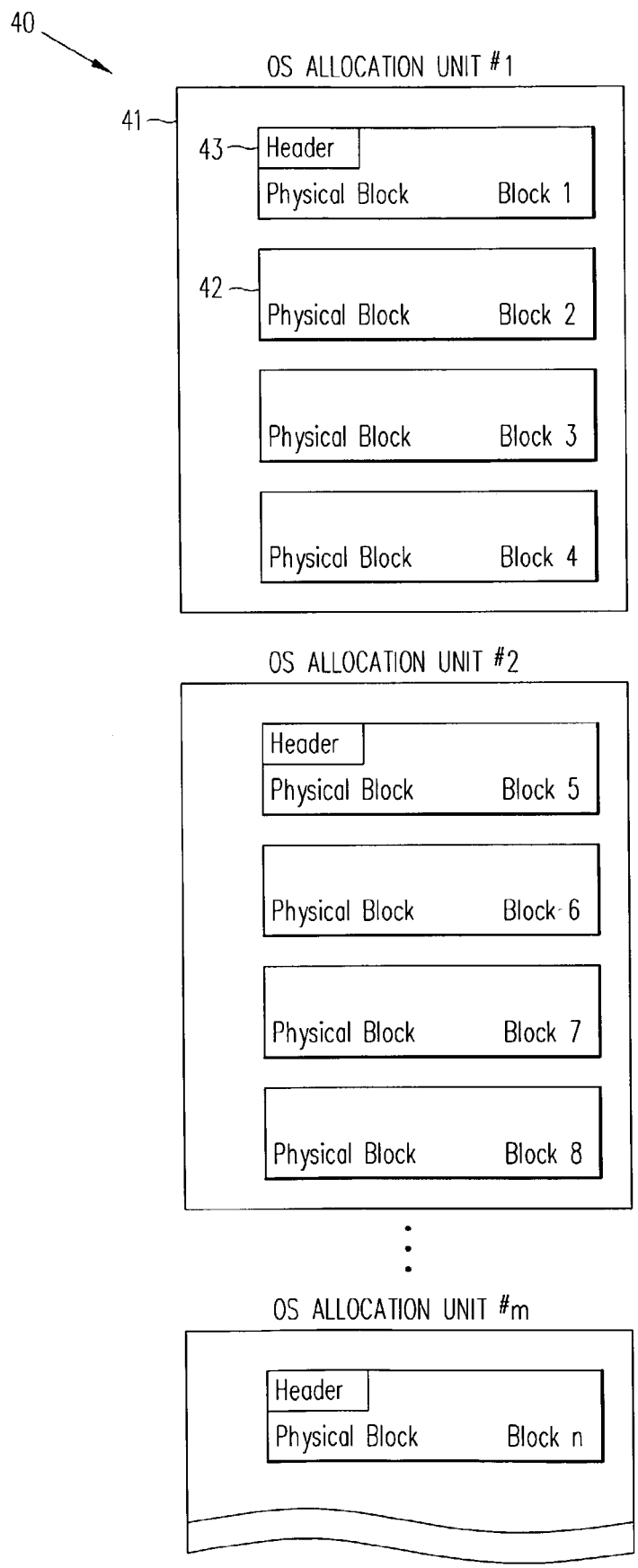
FIG. 2 shows a representation of physical blocks and the file allocation grouping as used by the operating system, in accordance with an embodiment of the present invention.

FIG. 2 shows a representation of "search allocation units" 40. In FIG. 2, after investigating the formatting information, if the application determines that the information is valid, it will retrieve the operating system "file allocation unit" 41. This value is the smallest sized data block that the operating system will access file data on the mass storage data device. This value is usually described in units of physical block size 42; therefore the file allocation unit 41 is a multiple of physical block size; usually in the range of thousands of bytes. The application program will then use the largest determined block size 42 as its search allocation unit; this will be either the physical block size 42 or the operating system allocation unit size 41.

Knowing that the operating system will only write file data in units of file allocation unit sizes, the application program searches for pertinent file header information 43 at the boundaries of these units; at the very most, the file allocation unit 41; at the very least the physical block size 42 of the mass storage data device.

This, therefore, will substantially increase the speed of the search as opposed to a byte-by-byte search on the mass storage data device. It is only necessary to examine the beginning of the search allocation units for the file header information 43. If no match of header information is found, the search algorithm skips to the beginning of the next search allocation unit on the mass storage data device. This process is continued until all areas on the mass storage data device have been examined.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. An image rescue system comprising:
    an application program for communication with a mass storage device, said application program being in communication with an operating system layer for accessing said mass storage device to read and write information;
    a device driver in communication with said application program, said operating system layer and said mass storage device, said device driver for allowing said application program to access said mass storage device to read and write information by bypassing said operating system layer, said device driver for communicating with said mass storage device to allow said application program to search for information in said mass storage device considered damaged by said operating system layer, said damaged information being inaccessible to said operating system layer, the device driver identifying the mass storage device and recovering information previously stored thereon even though the mass storage device includes damaged information; and
    direct access bus coupled between said application program and said device driver for causing direct communication therebetween, wherein said image rescue system accesses said mass storage device to rapidly and efficiently retrieve and recover information accessible and inaccessible to said operating system layer and further wherein said application program queries said mass storage device to determine absolute size of said mass storage device and physical block size of said mass storage device, wherein the said application program retrieves an operating system file allocation unit to access information in said mass storage device, said application device identifies a search allocation unit based on said physical block size of said mass storage device and said operating system file allocation unit.

2. An image rescue system as recited in claim 1 wherein said application program operates under said operating system layer to access said mass storage device for reading and writing information, said application program accesses said mass storage device at logical device level within said operating system layer.

3. An image rescue system as recited in claim 1 wherein said device driver includes an access interface for allowing said application program to directly access said device driver by circumventing said operating system layer.

4. An image rescue system as recited in claim 3 wherein said access interface is transparent to said operating system layer, said operating system layer interacting with said device driver.

5. An image rescue system as recited in claim 4 wherein said application program calls functions and procedures included in said access interface, said functions and procedures allow said application program to command said mass storage device with standard and vendor specified commands.

6. An image rescue system as recited in claim 5 wherein said functions and procedures in said access interface allow said application program to access information and data locations within said mass storage device inaccessible to said operating system layer.

7. An image rescue system as recited in claim 1 wherein said application program accesses said mass storage device directly at physical device level by circumventing said operating system layer.

8. An image rescue system as recited in claim 1 included within a personal computer (PC), said image rescue system being connected to said mass storage device via a universal serial bus (USB).

9. An image rescue system as recited in claim 1 wherein said application program rapidly searches and recovers data files with distinguishable data headers in said mass storage device.

10. An image rescue system as recited in claim 9 wherein said data headers include data patterns corresponding to tag image file format (TIFF) files.

11. An image rescue system as recited in claim 1 wherein said application program reads operating system formatting information in said mass storage device, said application program interprets said operating system formatting information according to said operating system layer.

12. An image rescue system as recited in claim 11 wherein said application program determines validity of said operating system formatting information by examining values of specific parameters included in said operating system formatting information.

13. An image rescue system as recited in claim 1 wherein said application program searches for file header information in said search allocation unit to rapidly access information in said mass storage device.

* * * * *